(12) United States Patent
Kiff et al.

(10) Patent No.: US 10,331,845 B2
(45) Date of Patent: Jun. 25, 2019

(54) FUSE MULTIPLE DRAWINGS INTO AN EQUIPMENT (BIM) MODEL

(71) Applicant: Honeywell International Inc., Morristown, NJ (US)

(72) Inventors: Liana Maria Kiff, Minneapolis, MN (US); Henry Chen, Beijing (CN); Jiangeng Du, Beijing (CN); Yan Xia, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 781 days.

(21) Appl. No.: 14/442,111

(22) PCT Filed: Nov. 16, 2012

(86) PCT No.: PCT/CN2012/084717
§ 371 (c)(1),
(2) Date: May 12, 2015

(87) PCT Pub. No.: WO2014/075280
PCT Pub. Date: May 22, 2014

(65) Prior Publication Data
US 2015/0347671 A1    Dec. 3, 2015

(51) Int. Cl.
*G06F 17/50* (2006.01)
*G06T 17/00* (2006.01)

(52) U.S. Cl.
CPC ...... *G06F 17/5086* (2013.01); *G06F 17/5004* (2013.01); *G06T 17/00* (2013.01); *G06F 2217/34* (2013.01); *G06T 2210/04* (2013.01)

(58) Field of Classification Search
CPC ............ G06F 17/5086; G06F 17/5004; G06F 2217/34; G06T 17/00

(Continued)

(56) References Cited

U.S. PATENT DOCUMENTS 5,740,341 A * 4/1998 Oota ..................... G06F 17/509
345/420
6,965,848 B2 * 11/2005 Ballus ................. G06F 17/5004
454/231

(Continued)

FOREIGN PATENT DOCUMENTS

AU    2011265503 A1    7/2012
CN    102687085 A    9/2012

(Continued)

OTHER PUBLICATIONS

J. Cagan et. al., A survery of computational approaches to three-dimensional layout problems, Computer-Aided Design 34 (2002) 597-611, 2001.*

(Continued)

*Primary Examiner* — Rehana Perveen
*Assistant Examiner* — Justin C Mikowski
(74) *Attorney, Agent, or Firm* — Seager Tufte & Wickhem LLP

(57) ABSTRACT

A method (100) for creating a three-dimensional mechanical system model includes aligning a plurality of mechanical systems drawings covering multiple interconnected levels of a structure via a processor (104), extracting a plurality of mechanical features from the plurality of mechanical systems drawings (106), identifying a supply relationship between the plurality of mechanical features (108), calculating supply requirements to support the plurality of mechanical features (110), and creating a three-dimensional model of the plurality of mechanical features (112) for the multiple interconnected levels.

11 Claims, 11 Drawing Sheets

(58) Field of Classification Search
USPC .............................................................. 703/7
See application file for complete search history.

(56) References Cited

U.S. PATENT DOCUMENTS

| | | | |
|---|---|---|---|
| 8,606,554 B2 | 12/2013 | Zimmermann et al. | |
| 9,367,737 B2 | 6/2016 | Chen et al. | |
| 2005/0131658 A1 | 6/2005 | Mei et al. | |
| 2009/0092289 A1* | 4/2009 | Rye | G06T 17/10 382/113 |
| 2010/0275018 A1* | 10/2010 | Pedersen | G06T 19/00 713/168 |
| 2011/0010633 A1* | 1/2011 | Richmond | H04L 41/12 715/736 |
| 2011/0088000 A1* | 4/2011 | Mackay | G06T 19/00 715/853 |
| 2011/0209081 A1 | 8/2011 | Chen | |
| 2011/0218777 A1 | 9/2011 | Chen et al. | |
| 2014/0100815 A1* | 4/2014 | Dubuc | G06Q 10/10 702/152 |
| 2015/0131871 A1 | 5/2015 | Chen et al. | |
| 2015/0286750 A1 | 10/2015 | Chen et al. | |

FOREIGN PATENT DOCUMENTS

| | | |
|---|---|---|
| WO | WO-2012/024692 A2 | 2/2012 |
| WO | WO-2014/000139 A1 | 1/2014 |
| WO | WO-2014/075280 A1 | 5/2014 |

OTHER PUBLICATIONS

Andre Borrmann et. al., Collaborative computational steering: Principles and application in HVAC layout, Integrated Computer-Aided Engineering 13 (2006) 361-376.*
L. G. Caldas, Genetic Algorithms for Optimization of Building Envelopes and the Design and Control of HVAC Systems, Journal of Solar Energy Engineering, Aug. 2003, vol. 125, 343-351.*
Michael Wybrow et. al., Orthogonal Connector Routing, Graph Drawing 17th International Symposium, GD 2009, Chicago, IL, USA, Sep. 22-25, 2009, 219-231.*
"International Application Serial No. PCT/CN2012/084717, International Preliminary Report on Patentability dated May 19, 2015", 5 pgs.
"International Application Serial No. PCT/CN2012/084717, International Search Report dated Aug. 22, 2013", 2 pgs.
"International Application Serial No. PCT/CN2012/084717, Written Opinion dated Aug. 22, 2013", 4 pgs.
"European Application Serial No. 12888615.7, Extended European Search Report dated Jul. 25, 2016", 7 pgs.
Appel, M, et al., "Registration of Technical Drawings and Calibrated Images for Industrial Augmented Reality", *Proceedings, Fifth IEEE Workshop on Applications of Computer Vision*, (2000), 48-55.
Goldberg, H. Edward, "The Building Information Model—Is BIM the Future for AEC Design?", *Cadalyst*, vol. 21, No. 11, (Nov. 2004), 56-59.
Yin, Xuetao, et al., "Generating 3D Building Models from Architectural Drawings: A Survey", *IEEE Computer Graphics and Applications*, vol. 29, No. 1, (2009), 20-30.

* cited by examiner

FUSE MULTIPLE DRAWINGS INTO AN EQUIPMENT (BIM) MODEL

BACKGROUND

Equipment or HVAC modeling can be used in auto fault detection systems or in energy-efficient applications, including chiller optimization, boiler optimization, occupancy control, or preference-based control. Equipment or HVAC models may contain may components, such as Air Handling Units (AHUs), Variable Air Volume units (VAVs), or diffusers. HVAC systems may have defined control relationships between or among HVAC components, which may define the AHU that supplies specific VAVs, or may define the VAV that supplies specific diffusers. The HVAC system may also define the space in which a VAV is located, or which space is served by a specific diffuser. Given the number and complexity of these relationships, Equipment or HVAC modeling can be complex and time-consuming.

SUMMARY

A method for creating a three-dimensional mechanical system model includes aligning a plurality of mechanical systems drawings via a processor, extracting a plurality of mechanical features from the plurality of mechanical systems drawings, identifying a supply relationship between the plurality of mechanical features, calculating supply requirements to support the plurality of mechanical features, and creating a three-dimensional model of the plurality of mechanical features for multiple interconnected levels.

A system includes a drawing alignment module, a mechanical feature extraction module, a supply relationship identification module, a mechanical feature supply module, and a three-dimensional modeling module. The drawing alignment module is configured to align a plurality of mechanical systems drawings. The mechanical feature extraction module is configured to extract a plurality of mechanical features from the plurality of mechanical systems drawings. The supply relationship identification module is configured to identify a supply relationship between the plurality of mechanical features. The mechanical feature supply module is configured to calculate supply requirements to support the plurality of mechanical features. The three-dimensional modeling module is configured to create a three-dimensional model of the plurality of mechanical features for multiple interconnected levels.

A computer-readable medium comprising instructions that, when executed by a machine, cause the machine to align a plurality of mechanical systems drawings, extract a plurality of mechanical features from the plurality of mechanical systems drawings, identify a supply relationship between the plurality of mechanical features, supply requirements to support the plurality of mechanical features, and create a three-dimensional model of the plurality of mechanical features for multiple interconnected levels.

DETAILED DESCRIPTION

Figure 1:
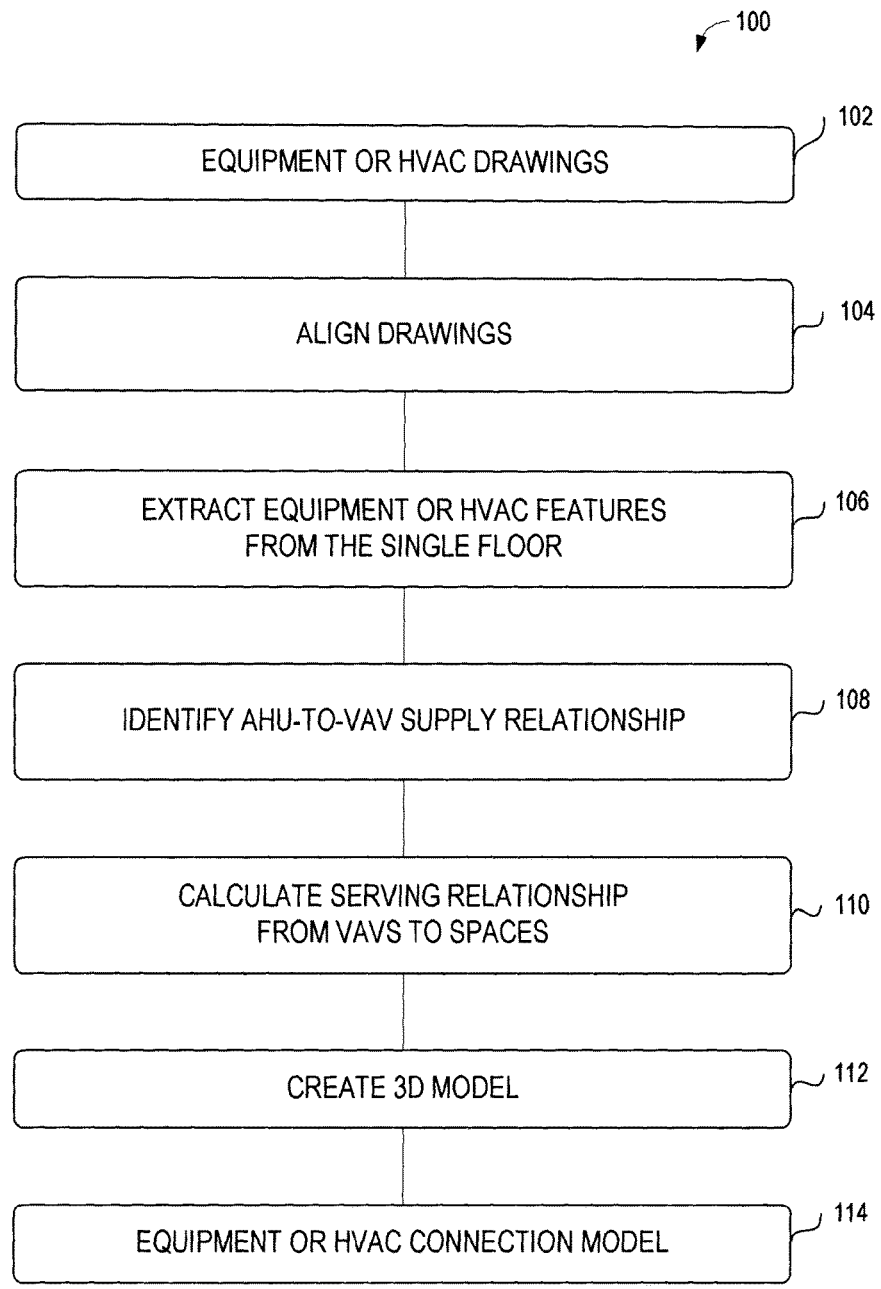
FIG. 1 is a flowchart of an example process of a constructing an equipment or HVAC connection model from equipment or HVAC drawings according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Generally, HVAC plan drawings only define single-floor connection relationships between or among HVAC components. For HVAC systems implemented in buildings with multiple floors, the equipment or HVAC model must define the HVAC relationship between or among floors. It is costly to hire architectures or domain experts to manually determine the HVAC connection relationships between or among floors. Moreover, with a manual process of defining the relationships, it is difficult or infeasible to update the multiple-floor model when the single-floor model is revised.

An embodiment addresses the above-identified problem with multiple-floor equipment or HVAC models, and describes a method for rapidly constructing a multiple-floor equipment or HVAC model from single-floor models. The method may combine the connection relationships from a single-floor model with the vertical connection relationship among different levels. In order to create vertical connection relationships, the method may use supply/return air ducts as a bridge to connect AHUs and VAVs. The embodiment also may use geometry analysis to calculate the serving relationships among VAVs and spaces.

An embodiment may save installation time by rapidly constructing whole equipment or HVAC model for various applications. For example, an embodiment may provide intuitive alignment operations to rapidly align drawings from different floors. Creation of the model may include automatically deducing the serving relationship from VAVs to spaces using geometry analysis, or automatically creating vertical ductwork according to the connection relationships between AHUs and VAVs. An embodiment may also provide an intuitive, graph-based operation to specify AHUs to VAVs supply relationship, and may provide a three-dimensional display to allow the user to verify the resulting model.

FIG. 1 is a flowchart of an example process of constructing an equipment or HVAC connection model from equipment or HVAC drawings 100 according to an example embodiment. In the embodiment shown in FIG. 1, equipment or HVAC drawings 102 are provided for each floor. Because these drawings may not be uniform in scale or orientation, the process may align the drawings 104. Once aligned, the process may extract equipment or HVAC features from each single-floor drawing 106. Using the extracted equipment or HVAC information, the process may provide an intuitive, graph-based operation to allow specification of the supply relationship between and among AHUs and VAVs 108. AHUs may be added, or supply/return air ducts may be used as a bridge between AHUs and VAVs. Once the relationships have been specified, the process may calculate the serving relationship from VAVs to spaces via geometry analysis 110. Using the defined relationships, the process may create a three-dimensional model representing the equipment or HVAC features 114. In various embodiments, the user may specify or define relationships, or the process may recommend, specify, or define the relationships.

Figure 2:
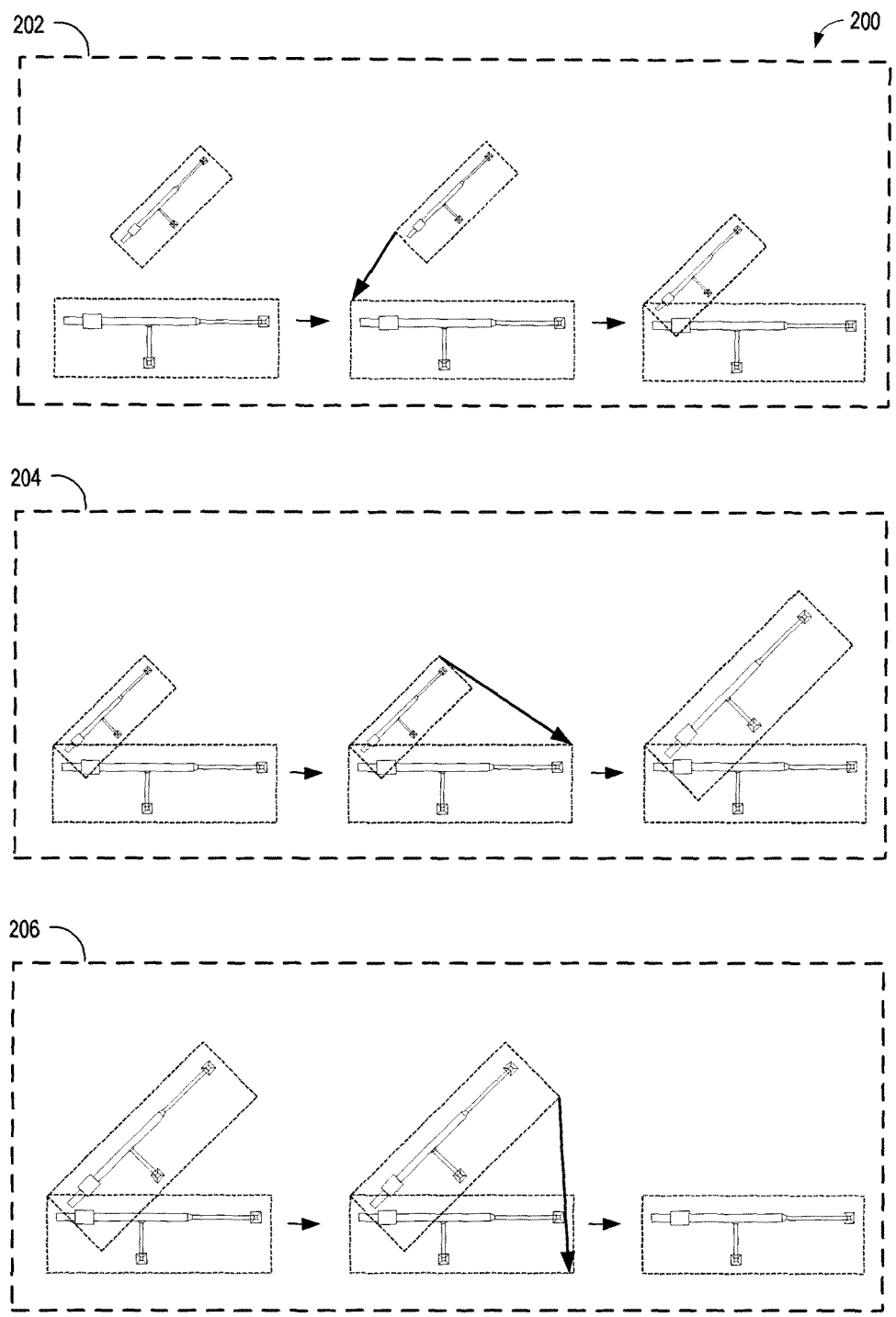
FIG. 2 is an example of the steps involved in translating, scaling, and rotating a drawing according to an example embodiment.

FIG. 2 is an example alignment operation including translating, scaling, and rotating a drawing 200 according to an example embodiment. In the embodiment shown in FIG. 2, the equipment or HVAC drawings may not be uniform in scale or orientation, especially if the drawings were created by different institutes or designers. The alignment operation may include translating the drawing 202, scaling the drawing 204, or rotating the drawing 206. These operations may be used individually, or in any combination. In various embodiments, the user may perform the alignment operation, or the alignment operation may be automated. In order to align two drawings, the alignment operation may require two or three of these transformations. Alternatively, the alignment operation may only need to perform a single operation to align two drawings, such as the translate transformation.

One embodiment reduces the number of required mouse operations, and uses an intuitive method to rapidly align two drawings requiring no more than three drag-and-drop mouse operations by the user. The translation operation 202 should be used to correct two drawings that have different positions. The positions can be corrected by applying a proper translate transformation on a drawing. To perform the translation operation 202, the user clicks on a vertex from one drawing, and drags that vertex to the corresponding vertex of the second drawing. The embodiment calculates and applies the translate transformation to the drawing to be translated, and displays the result. The scale operation 204 should be used to correct two drawings that have different scales. Two drawings may have different scales due to using different measurement units, e.g., when one drawing units are in inches and the other drawing units are in feet. To perform the scale operation 204, the user clicks on a vertex from one drawing, and drags that vertex to the corresponding vertex of the second drawing. The embodiment calculates and applies the scale transform to the drawing to be scaled, and displays the result. The rotation operation 206 should be used to correct two drawings that have different orientations. To perform the rotation operation 206, the user clicks on a vertex from one drawing, and drags that vertex to the corresponding vertex of the second drawing. The embodiment calculates and applies the rotation transform to the drawing to be rotated, and displays the result.

Figure 3:
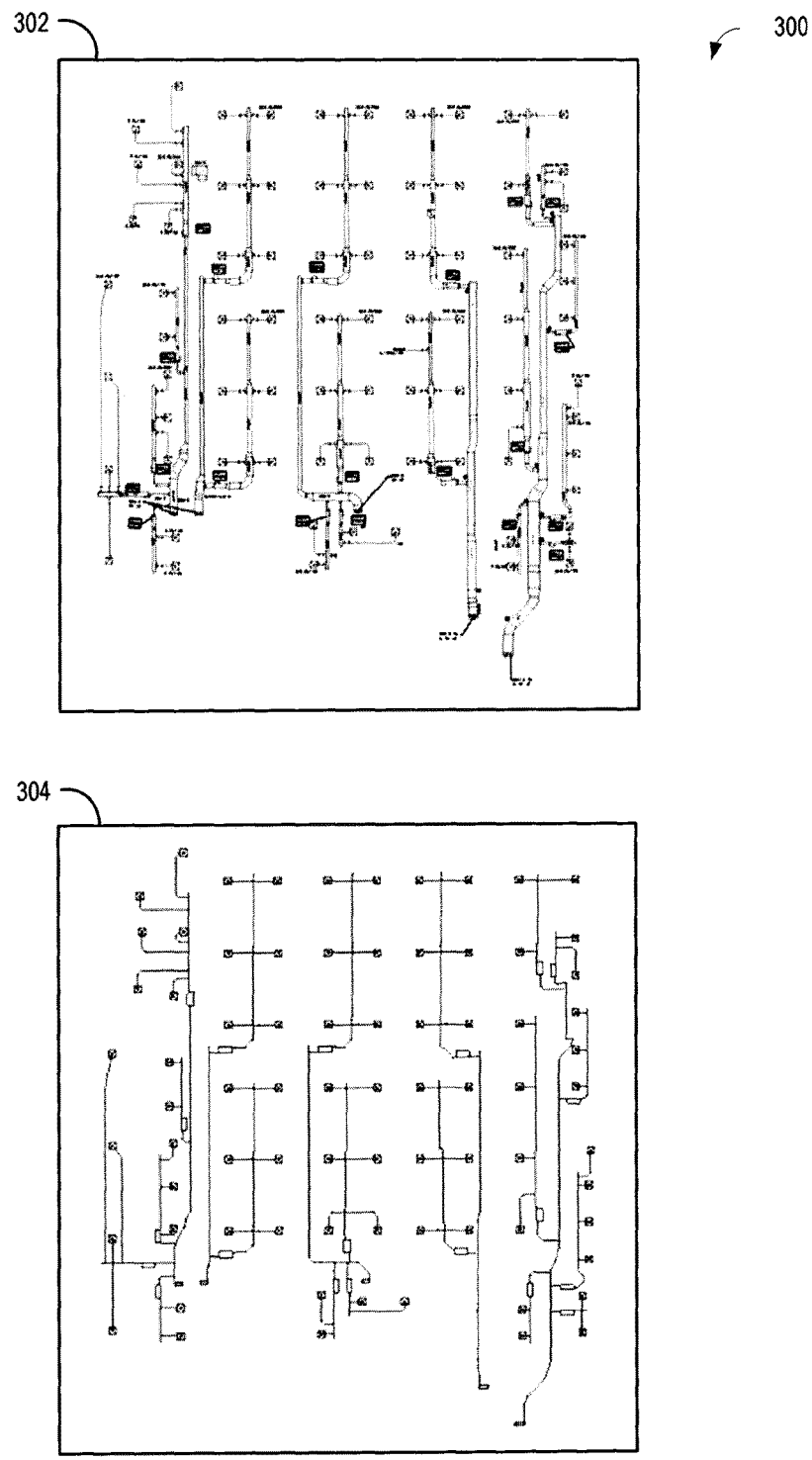
FIG. 3 is an example of the steps involved in extracting equipment or an HVAC features from a single floor according to an example embodiment.

FIG. 3 is an example extraction operation, including extracting an equipment or an HVAC features from a single floor 300 according to an example embodiment. In the embodiment shown in FIG. 3, planar equipment or HVAC connections and supply relationships are extracted from an HVAC model 302. Extraction can begin with identifying equipment, such as supply/return air ducts, VAVs, diffusers, or other devices, and attaching names to the corresponding devices. Once identified, the connection and supply relationship may be extracted for the floor using a connection approximation algorithm. For example, the algorithm may define which VAV supplies a particular diffuser. Following extraction, a model 304 is generated that identifies the devices, defines the connections, and defines the supply relationship between or among the devices.

Figure 4:
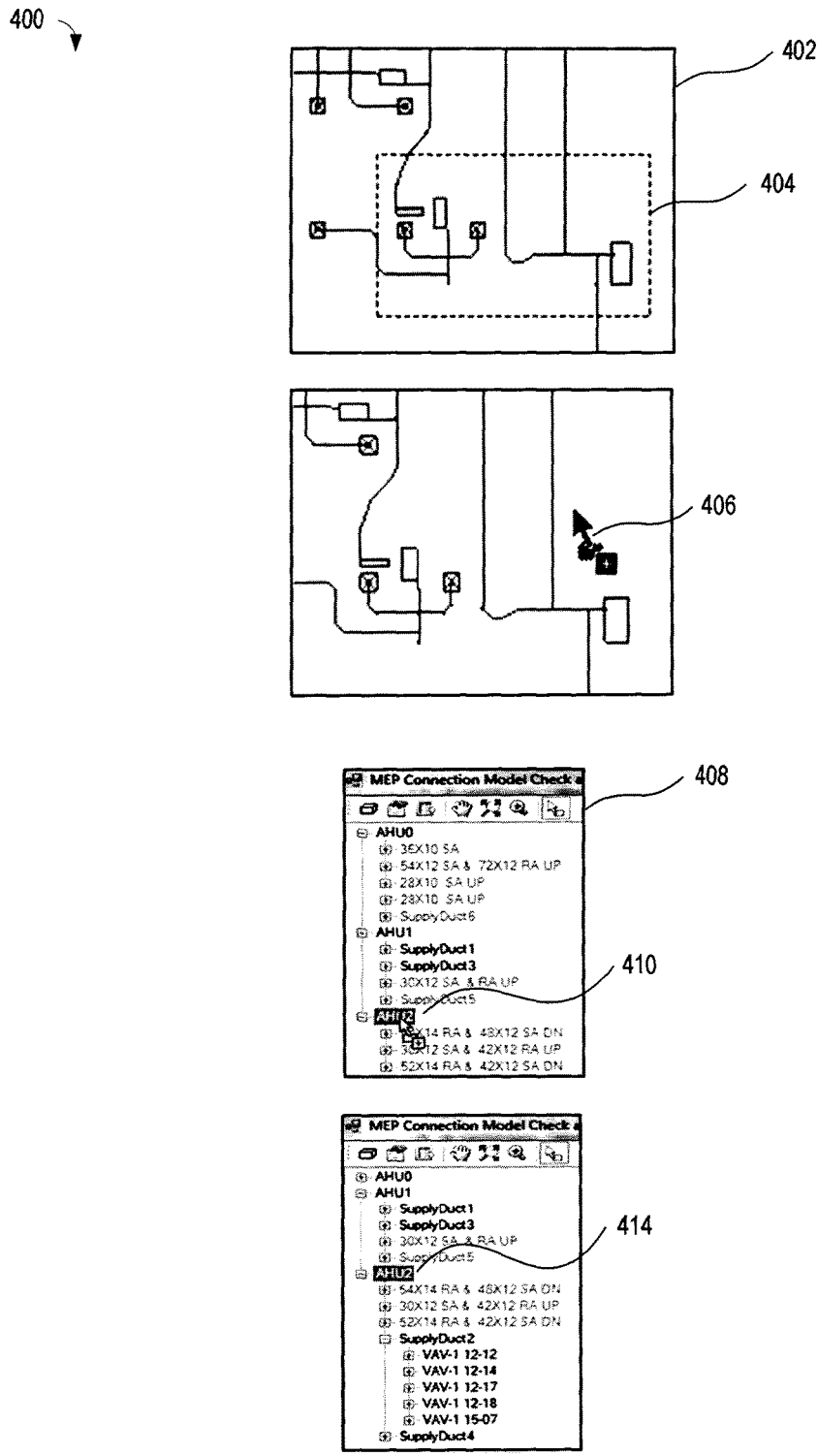
FIG. 4 is an example of the steps involved in specifying supply relationships between or among AHUs and VAVs according to an example embodiment.

FIG. 4 is an example supply relationship operation, including specifying supply relationships between or among AHUs and VAVs 400 according to an example embodiment. In the embodiment shown in FIG. 4, within a portion of the HVAC display panel 402, a supply/return air duct 404 can be selected. The selected supply/return air duct 404 can be associated with the connection model 408, such as through a drag-and-drop operation. In the connection model 408, a hierarchy tree is used to represent the equipment or HVAC features. In the hierarchy, the first level nodes are AHUs, followed by supply ducts, followed by VAVs, followed by diffusers at the last level. When the selected duct is associated with the destination AHU in the tree node 410, the duct will be regarded as one of the secondary nodes of the tree. The connection model then updates the hierarchy tree structure 414 to include the newly added duct, and all VAVs connected to the selected supply/return air duct will be attached as the children of AHU. In various embodiments, the user may specify or define relationships, or the supply relationship operation may recommend, specify, or define the supply relationships.

Figure 5:
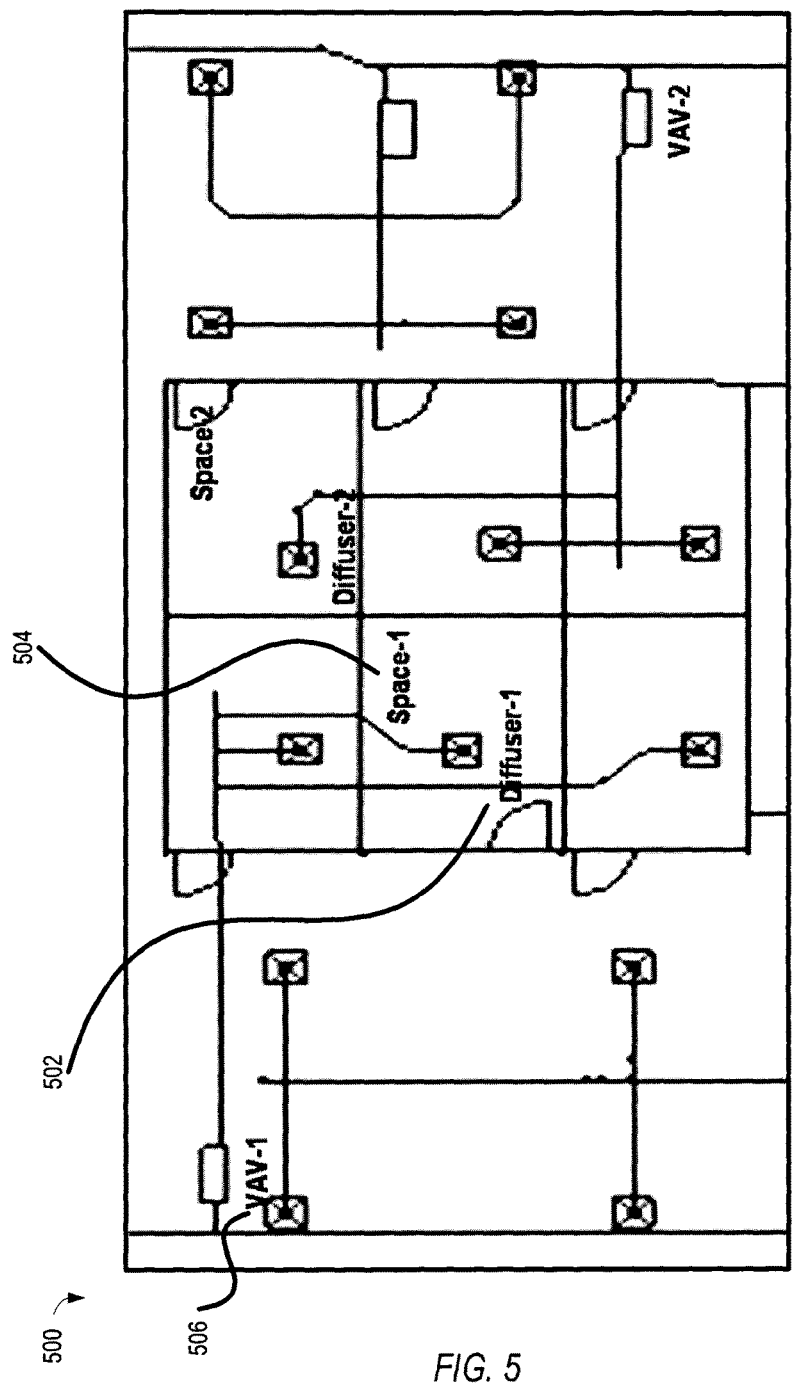
FIG. 5 is an example of calculating serving relationship from VAVs to spaces according to an example embodiment.

FIG. 5 is an example of calculating serving relationship from VAVs to spaces 500 according to an example embodiment. In the embodiment shown in FIG. 5, at least one diffuser may correspond with each space. For example, a space may be defined by an office, and one or more diffusers may be assigned to that space. A given VAV may supply one or more diffusers within a particular space. Using the location of the spaces and the diffusers and the VAV-diffuser supply relationships, the embodiment calculates which diffusers correspond with a particular space. For example, Diffuser-1 502 is within Space-1 504, and Diffuser-1 502 is supplied by VAV-1 506.

Figure 6:
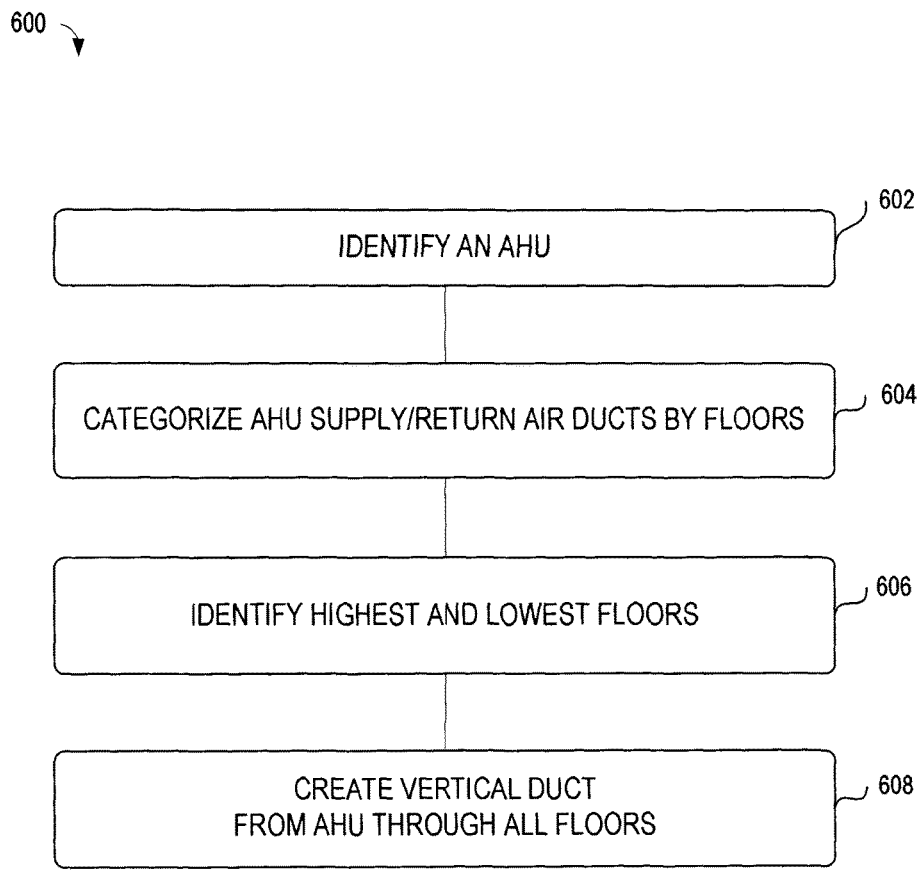
FIG. 6 is a flowchart of an example process of creating vertical ductwork for supply/return air ducts on multiple floors according to an example embodiment.

FIG. 6 is a flowchart of an example process of creating vertical ductwork for supply/return air ducts on multiple floors 600 according to an example embodiment. In the embodiment shown in FIG. 6, a connection model may include multiple levels across multiple floors. Generating the model begins by identifying a single AHU 602. For a given AHU, the supply/return air ducts are categorized by floors 604. Using the categorization of the ducts, the highest and lowest floors are identified 606. Using knowledge of the highest and lowest floors, the vertical duct is created from the AHU through all floors 608. The vertical ductwork created in 600 may be used to generate a three-dimensional model. A three-dimensional model display may reflect the serving relationships, and the model may be used to visually inspect the serving relationships.

Figure 7:
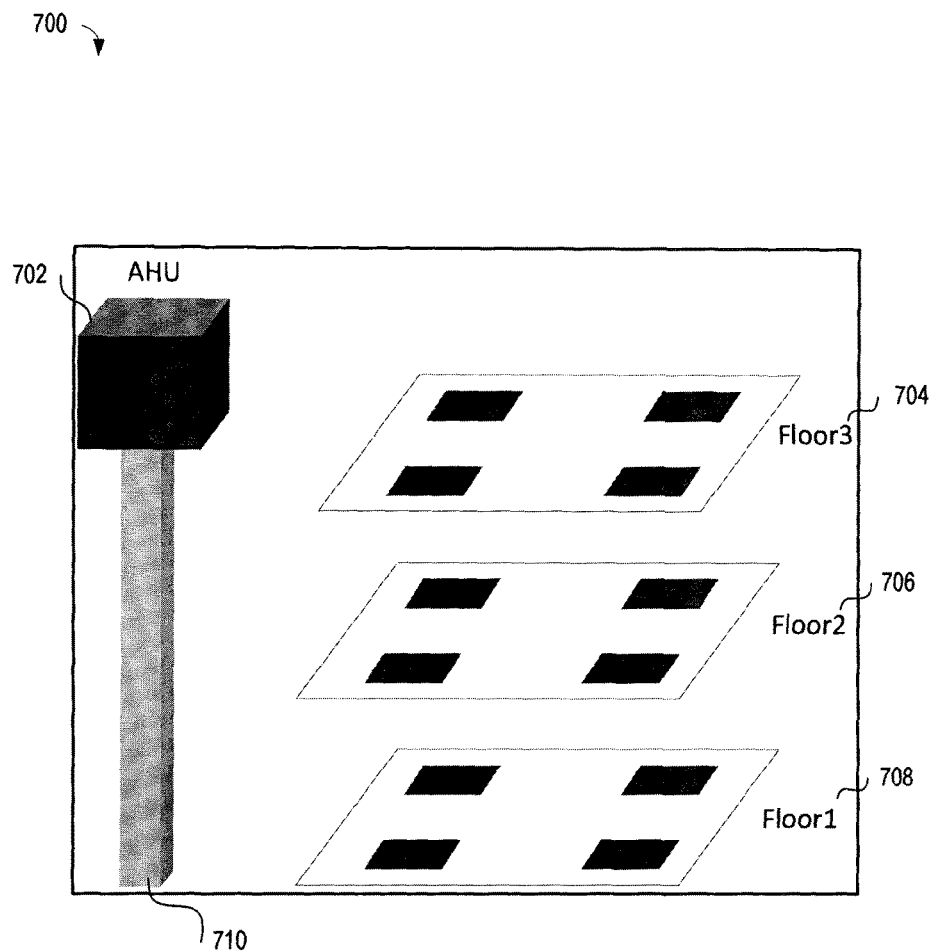
FIG. 7 is an example of a three-dimensional model of vertical ductwork for supply/return air ducts on multiple floors according to an example embodiment.

FIG. 7 is an example of a three-dimensional model of vertical ductwork for supply/return air ducts on multiple floors 700 according to an example embodiment. The three-dimensional model 700 may include single-floor representations 704, 706, and 708 of the ducts that have been extracted in previous steps. However, previous embodiments defined a vertical connection relationship using two-dimensional operations. Two-dimensional representations defined relationships between VAVs and supply/return air ducts, but each supply/return duct did not have a parent element. To define the vertical connections in a three-dimensional model, the embodiment calculates paths connecting AHUs to supply/return air ducts or VAVs.

In the embodiment shown in FIG. 7, the three-dimensional model represents ductwork connecting supply/return air duct to an AHU as created by example process 600. As mentioned previously, generating the model begins by identifying a single AHU 702. For AHU 702, the supply/return air ducts are categorized into individual floors 704, 706, and 708. Using the categorization of the ducts, the highest floor is identified 704, and the lowest floor is identified 708. Using knowledge of the highest and lowest floors, the vertical duct 710 is created from the AHU 702 through the highest floor 704, extending to the lowest floor 708.

Figure 8:
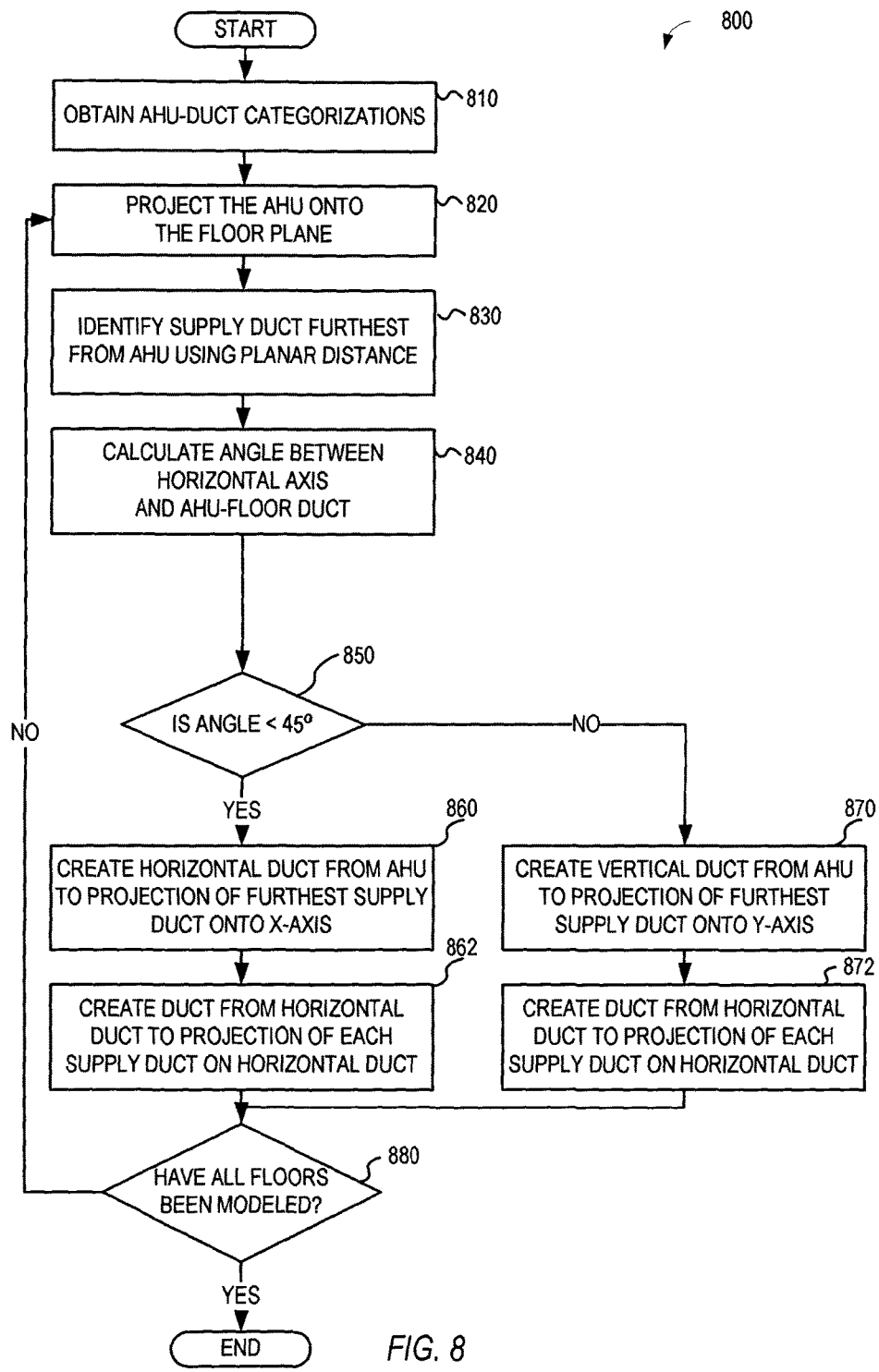
FIG. 8 is a flowchart of an example process of connecting vertical ductwork between an AHU and supply/return air ducts on different floors according to an example embodiment.

FIG. 8 is a flowchart of an example process of connecting vertical ductwork between an AHU and supply/return air ducts on different floors 800 according to an example embodiment. In the embodiment shown in FIG. 8, an AHU-duct categorization list is obtained 810, for example, using the previously generated AHU supply/return air duct categorizations 604. For a particular floor, the location of the AHU is projected onto the plane of the floor 820. Planar distance between the projected AHU location and supply ducts are used to identify the supply duct furthest from the projection 830. Using the horizontal axis and a line between the furthest duct and the AHU, an angle is calculated 840, and the angle is compared against a 45-degree angle 850. If the angle is less than a 45-degree angle, a horizontal duct is created from the AHU to a projection of the furthest supply duct onto the x-axis 860, and a duct is created from the horizontal duct to a projection of each supply duct onto the horizontal duct 862. If the angle is not less than a 45-degree angle, a vertical duct is created from the AHU to a projection of the furthest supply duct onto the y-axis 870, and a duct is created from the horizontal duct to a projection of each supply duct onto the horizontal duct 872. If all floors have not been modeled 880, the next unmodeled floor is identified, and the process begins anew by projecting the AHU onto the next unmodeled floor 820.

Figure 9:
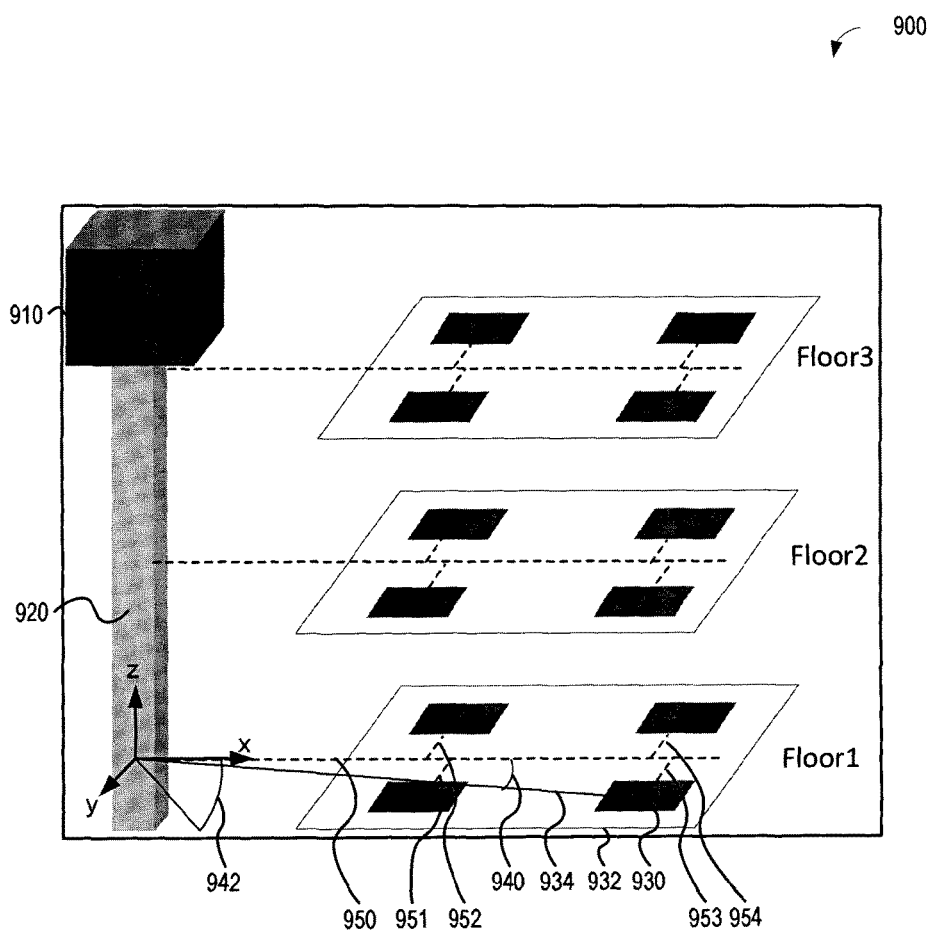
FIG. 9 is an example of a three-dimensional model of vertical ductwork connecting an AHU to supply/return air ducts on different floors according to an example embodiment.

FIG. 9 is an example of a three-dimensional model of vertical ductwork connecting an AHU to supply/return air ducts on different floors 900 according to an example embodiment. The embodiment 900 shown in FIG. 9 can result from the process 800 of connecting vertical ductwork between an AHU and supply/return air ducts on different floors. As in process 800, embodiment 900 begins by projecting the location of an AHU 910 onto the plane of a floor 920.

Planar distance between the projected AHU location and supply ducts are used to identify the supply duct furthest from the projection 930. Using the horizontal plane 932 and a line 934 between the furthest duct 930 and the AHU projection 920, a duct angle is calculated 940. The angle 940 is compared against a 45-degree angle 942. If the duct angle 940 is smaller than 45-degree angle 942, a horizontal duct 950 is created from the AHU projection 920 to a projection of the furthest supply duct onto the x-axis, and perpendicular ducts 951, 952, 953, and 954 are created from the horizontal duct 950 to projection of each supply duct onto the horizontal duct 950. If the angle is not less than a 45-degree angle, a vertical duct is created from the AHU to a projection of the furthest supply duct onto the y-axis, and a duct is created from the horizontal duct to a projection of each supply duct onto the horizontal duct. If all floors have been modeled, the next unmodeled floor is identified, and the process begins anew by projecting the AHU onto the next unmodeled floor.

Figure 10:
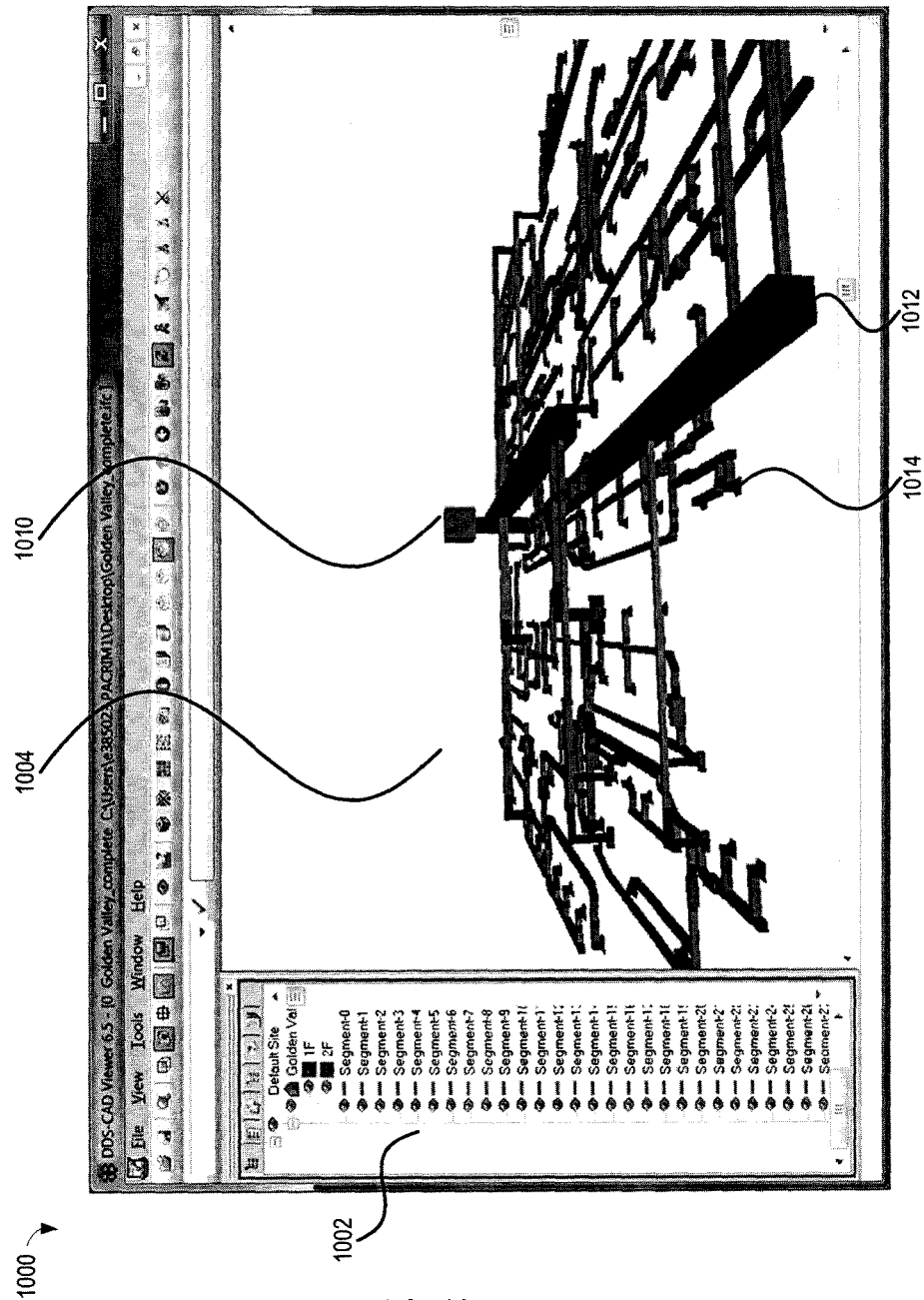
FIG. 10 is an example of a whole equipment or HVAC model in DDS viewer according to an example embodiment.

FIG. 10 is an example of a whole equipment or HVAC model in DDS viewer 1000 according to an example embodiment. In the embodiment shown in FIG. 10, the equipment or HVAC model components are displayed in a tree structure 1002 according to their hierarchy. As described above, the first level nodes of the hierarchy are AHUs, followed by supply ducts, followed by VAVs, followed by diffusers at the last level. The viewer displays a three-dimensional model 1004 corresponding to the hierarchical tree structure 1002. The three-dimensional model can be rotated or scaled, and enables the user to perform a visual inspection on the hierarchy. The three-dimensional model includes an AHU 1010, one or more ducts 1012, or one or more diffusers 1014.

Figure 11:
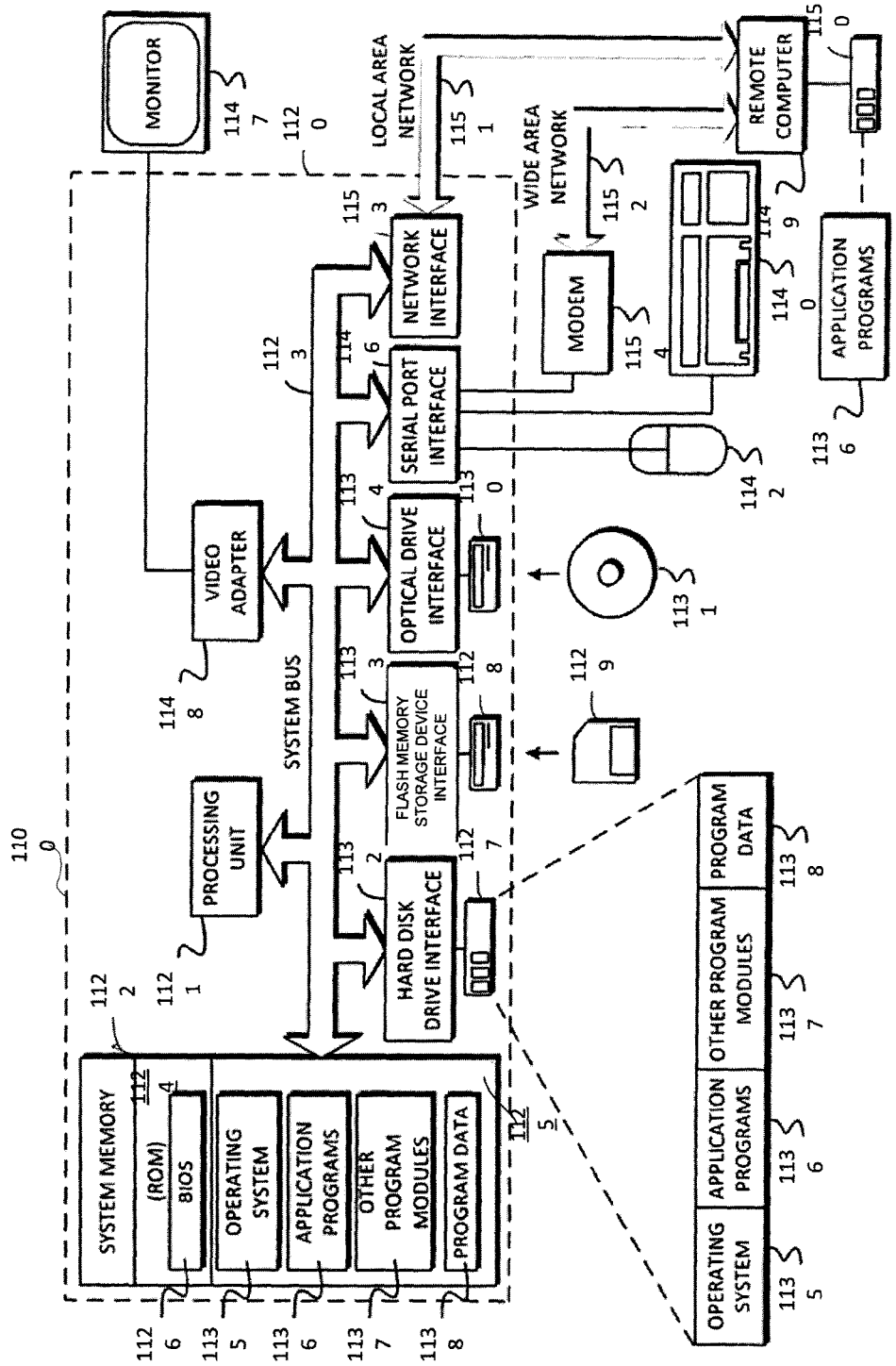
FIG. 11 is a block diagram of an example of a computer system upon which one or more embodiments of the current disclosure can execute.

FIG. 11 is a block diagram of a computer system to implement methods according to an example embodiment. In the embodiment shown in FIG. 11, a hardware and operating environment is provided on which software may be executed to rapidly construct whole equipment or HVAC model for various applications as shown in FIGS. 1-10.

As shown in FIG. 11, one embodiment of the hardware and operating environment includes a general purpose computing device in the form of a computer 1100 (e.g., a personal computer, workstation, or server), including one or more processing units 1121, a system memory 1122, and a system bus 1123 that operatively couples various system components including the system memory 1122 to the processing unit 1121. There may be only one or there may be more than one processing unit 1121, such that the processor of computer 1100 comprises a single central-processing unit (CPU), or a plurality of processing units, commonly referred to as a multiprocessor or parallel-processor environment. In various embodiments, computer 1100 is a conventional computer, a distributed computer, or any other type of computer.

The system bus 1123 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1124 and random-access memory (RAM) 1125. A basic input/output system (BIOS) program 1126, containing the basic routines that help to transfer information between elements within the computer 1100, such as during start-up, may be stored in ROM 1124. The computer 1100 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media.

The hard disk drive 1127, magnetic disk drive 1128, and optical disk drive 1130 couple with a hard disk drive interface 1132, a magnetic disk drive interface 1133, and an optical disk drive interface 1134, respectively. The drives and their associated computer-readable media provide non volatile storage of computer-readable instructions, data structures, program modules and other data for the computer 1100. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1129, optical disk 1131, ROM 1124, or RAM 1125, including an operating system 1135, one or more application programs 1136, other program modules 1137, and program data 1138. Programming for implementing one or more processes or method described herein may be resident on any one or number of these computer-readable media.

A user may enter commands and information into computer 1100 through input devices such as a keyboard 1140 and pointing device 1142. Other input devices (not shown) can include a microphone, joystick, game pad, satellite dish, scanner, or the like. These other input devices are often connected to the processing unit 1121 through a serial port interface 1146 that is coupled to the system bus 1123, but can be connected by other interfaces, such as a parallel port, game port, or a universal serial bus (USB). A monitor 1147 or other type of display device can also be connected to the system bus 1123 via an interface, such as a video adapter 1148. The monitor 1147 can display a graphical user interface for the user. In addition to the monitor 1147, computers typically include other peripheral output devices (not shown), such as speakers and printers.

The computer 1100 may operate in a networked environment using logical connections to one or more remote computers or servers, such as remote computer 1149. These logical connections are achieved by a communication device coupled to or a part of the computer 1100; the invention is not limited to a particular type of communications device. The remote computer 1149 can be another computer, a server, a router, a network PC, a client, a peer device or other common network node, and typically includes many or all of the elements described above I/O relative to the computer 1100, although only a memory storage device 1150 has been illustrated. The logical connections depicted in FIG. 11 include a local area network (LAN) 1151 and/or a wide area network (WAN) 1152. Such networking environments are commonplace in office networks, enterprise-wide computer networks, intranets and the internet, which are all types of networks.

When used in a LAN-networking environment, the computer 1100 is connected to the LAN 1151 through a network interface or adapter 1153, which is one type of communications device. In some embodiments, when used in a WAN-networking environment, the computer 1100 typically includes a modem 1154 (another type of communications device) or any other type of communications device, e.g., a wireless transceiver, for establishing communications over the wide-area network 1152, such as the internet. The modem 1154, which may be internal or external, is connected to the system bus 1123 via the serial port interface 1146. In a networked environment, program modules depicted relative to the computer 1100 can be stored in the remote memory storage device 1150 of remote computer, or server 1149. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for creating a three-dimensional mechanical system model, the method comprising:
   applying a transformation via a processor to one or more of a plurality of mechanical systems drawings covering multiple interconnected levels of a structure to align the plurality of mechanical systems drawings, wherein the plurality of mechanical systems drawings each have an associated x-axis and an associated y-axis;
   extracting a plurality of mechanical features from the plurality of mechanical systems drawings;
   identifying a supply relationship between the plurality of mechanical features;
   calculating supply requirements to support the plurality of mechanical features; and
   creating a three-dimensional model of the plurality of mechanical features for the multiple interconnected levels,
   wherein calculating supply requirements includes:
      projecting a vertical mechanical feature supply onto a plurality of building floors;
      identifying, for each floor in the plurality of building floors, a furthest mechanical feature installation from the projection of the vertical mechanical feature supply; and
   modeling a mechanical feature supply conduit includes:
   when the angle is less than forty-five degrees, aa mechanical feature supply conduit between the vertical mechanical feature supply and the furthest mechanical feature installation; and
   wherein modeling the mechanical feature supply conduit further includes:

calculating an angle between the x-axis and a line between the furthest mechanical feature installation and the projection of the vertical mechanical feature supply;

modeling, when the angle is less than forty-five degrees, a first parallel mechanical feature supply conduit, parallel to the x-axis and in the direction of the furthest mechanical feature installation; and modeling, when the angle is greater than or equal to forty-five degrees, a second parallel mechanical feature supply conduit parallel to the y-axis and in the direction of the furthest mechanical feature installation.

2. The method of claim 1, wherein the transformation includes at least one of translating, scaling and rotating one or more of the plurality of mechanical systems drawings.

3. The method of claim 1, wherein extracting a plurality of mechanical features includes extracting Heating, Ventilation, or Air-Conditioning (HVAC) features.

4. The method of claim 1, wherein identifying a supply relationship between the plurality of mechanical features includes identifying a serving relationship between an Air Handling Unit (AHU) and a plurality of Variable Air Volume units (VAVs).

5. The method of claim 1, wherein identifying a supply relationship between the plurality of mechanical features includes identifying a serving relationship between a plurality of VAVs and a plurality of HVAC diffusers.

6. The method of claim 1, wherein modeling a mechanical feature supply conduit includes modeling a perpendicular mechanical feature supply conduit between the parallel mechanical feature supply conduit and each at least one mechanical feature installation.

7. A system comprising:
a drawing alignment module configured to applying a transformation to one or more of a plurality of mechanical systems drawings covering multiple interconnected levels of a structure to align the plurality of mechanical systems drawings, wherein the plurality of mechanical systems drawings each have an associated x-axis and an associated y-axis;
a mechanical feature extraction module configured to extract a plurality of mechanical features from the plurality of mechanical systems drawings;
a supply relationship identification module configured to identify a supply relationship between the plurality of mechanical features;
a mechanical feature supply module configured to calculate supply requirements to support the plurality of mechanical features; and
a three-dimensional modeling module configured to create a three-dimensional model of the plurality of mechanical features for multiple interconnected levels,
wherein to calculate supply requirements is performed by:
projecting a vertical mechanical feature supply onto a plurality of building floors;
identifying, for each floor in the plurality of building floors, a furthest mechanical feature installation from the projection of the vertical mechanical feature supply; and
modeling a mechanical feature supply conduit between the vertical mechanical feature supply and the furthest mechanical feature installation,
and wherein modeling the mechanical feature supply conduit includes:

calculating an angle between the x-axis and a line between the furthest mechanical feature installation and the projection of the vertical mechanical feature supply;

modeling, when the angle is less than forty-five degrees, a first parallel mechanical feature supply conduit, parallel to the x-axis and in the direction of the furthest mechanical feature installation; and modeling, when the angle is greater than or equal to forty-five degrees, a second parallel mechanical feature supply conduit parallel to the y-axis and in the direction of the furthest mechanical feature installation.

8. The system of claim 7, wherein the supply relationship identification module is configured to identify a serving relationship between an Air Handling Unit (AHU) and a plurality of Variable Air Volume units (VAVs).

9. The system of claim 7, wherein the supply relationship identification module is configured to identify a serving relationship between a plurality of VAVs and a plurality of HVAC diffusers.

10. A non-transitory computer-readable medium comprising instructions that, when executed by a machine, cause the machine to:
applying a transformation by the machine to one or more of a plurality of mechanical systems drawings covering multiple interconnected levels of a structure to align the plurality of mechanical systems drawings, wherein the plurality of mechanical systems drawings each have an associated x-axis and an associated y-axis;
extract a plurality of mechanical features from the plurality of mechanical systems drawings;
identify a supply relationship between the plurality of mechanical features;
calculate supply requirements to support the plurality of mechanical features; and
create a three-dimensional model of the plurality of mechanical features for multiple interconnected levels,
wherein to calculate supply requirements is performed by:
projecting a vertical mechanical feature supply onto a plurality of building floors;
identifying, for each floor in the plurality of building floors, a furthest mechanical feature installation from the projection of the vertical mechanical feature supply; and
modeling a mechanical feature supply conduit between the vertical mechanical feature supply and the furthest mechanical feature installation,
and wherein modeling the mechanical feature supply conduit includes:
calculating an angle between the x-axis and a line between the furthest mechanical feature installation and the projection of the vertical mechanical feature supply;
modeling, when the angle is less than forty-five degrees, a first parallel mechanical feature supply conduit, parallel to the x-axis and in the direction of the furthest mechanical feature installation; and
modeling, when the angle is greater than or equal to forty-five degrees, a second parallel mechanical feature supply conduit parallel to the y-axis and in the direction of the furthest mechanical feature installation.

11. The non-transitory computer-readable medium of claim 10, wherein to calculate the supply requirements to support the plurality of mechanical features is performed by modeling a perpendicular mechanical feature supply conduit between the parallel mechanical feature supply conduit and each at least one mechanical feature installation.

\* \* \* \* \*